Figure 1:
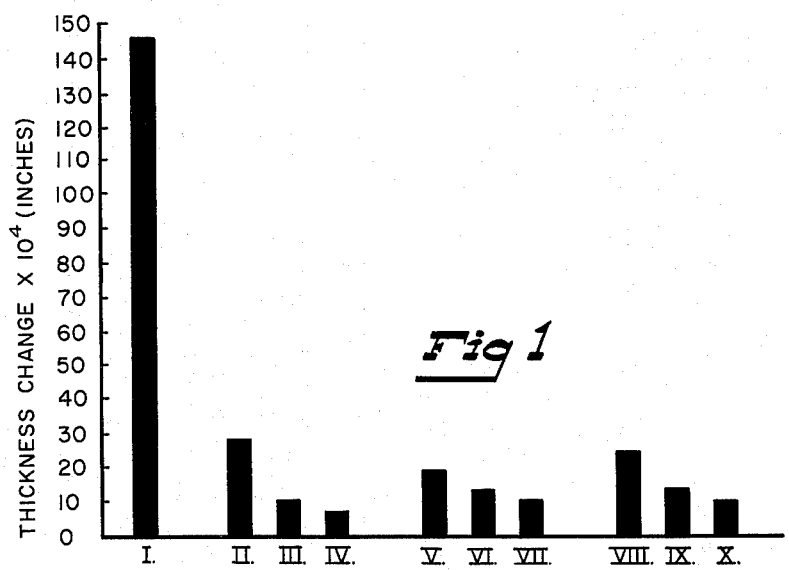

Dec. 21, 1965   CHOH HSIEN LI   3,224,966
LOW FRICTION MATERIAL
Filed March 7, 1962   2 Sheets-Sheet 1

INVENTOR.
CHOH HSIEN LI
BY
ATTORNEY

United States Patent Office 3,224,966
Patented Dec. 21, 1965

3,224,966
LOW FRICTION MATERIAL
Choh Hsien Li, Hopkins, Minn., assignor to Honeywell Inc., a corporation of Delaware
Filed Mar. 7, 1962, Ser. No. 178,151
6 Claims. (Cl. 252—12)

This invention relates generally to bearings and more specifically to bearing or low friction materials of the kind which include a polymer matrix or the like impregnated with hard particles.

Filled bearing materials are well known in the art. It has been a common practice to fill low friction matrices with hard filler particles to decrease the wear characteristics thereof. No particularly useful function has heretofore been ascribed to the shape of the filler particles per se. Consequently, random or irregularly shaped particles have been utilized in the prior art materials. The most common polymer matrix utilized in the art at the present time is polytetrafluoroethylene (hereinafter referred to as PTFE).

The following are a few of the common irregularly shaped fillers that have been used with a PTFE matrix:

(1) Ceramic and molybdenum disulphide
(2) Glass and molybdenum disulphide
(3) Glass and carbon
(4) Alumina (which has proved to be unsuccessful due to its abrasive nature and consequently is not recommended in the prior art).

Generally these fillers have been successful in decreasing the wear characteristics of the matrix material, but all have the common disadvantage of increasing its coefficient of friction. In fact, some of the harder materials such as alumina actually damage mating surfaces.

Referring to the present invention, it has been discovered that the use of spherically shaped filler particles not only decreases the wear characteristics of the matrix material but also allows it to retain essentially its original coefficient of friction. In addition, the improved wear, which results from the utilization of spherically shaped filler particles, is accomplished through the use of a lower volume percent filler (2½ to 10%) as compared to the volume percent filler utilized in the prior art materials (approximately 25%). The volume percent filler material of the present invention can be as high as 70% and yield good results in terms of wear and coefficient of friction. Of course, in actual use, the volume per cent filler required in a matrix material such as PTFE would depend on the load to which the bearing is exposed. Generally, it can be said that low loads require low volume percent fillers while high loads require high volume percent fillers. As stated above, the use of spherically shaped fillers not only improves the wear characteristics of the matrix material but also maintains the coefficient of friction of said matrix material close to that of the pure material rather than increasing the coefficient of friction as the irregularly shaped particles of the prior art tend to do.

A study of the prior art has revealed one reference of interest which utilizes a spherical filler material in a PTFE matrix. This reference is British Patent 837,198, issued June 9, 1960. The teaching of this reference is not directed to establishing the advantages accruing from the use of spherical particles per se in a bearing material matrix. Rather, the reference is concerned with increased tensile strength resulting from the use of various shapes of filler particles in a PTFE matrix.

The data presented concerning the present invention is the result of wear studies conducted on an apparatus employing reciprocating motion. This data represents average values of several runs for each sample.

The bearing material specimen was rubbed against a steel journal with a 20-pound load applied through a spring system. The tests were run for 40,000 cycles.

The invention can best be understood by a study of the following drawings wherein:

FIGURE 1 is a diagram comparing the wear resistance of pure PTFE with various prior art filled PTFE materials and with PTFE materials filled in accordance with the present invention.

I represents pure PTFE.

II represents PTFE filled with approximately 25 volume percent ceramic and molybdenum disulphide irregularly shaped particles.

III represents PTFE filled with approximately 25 volume percent glass and molybdenum disulphide irregularly shaped particles.

IV represents PTFE filled with approximately 25 volume percent glass and carbon irregularly shaped particles.

V represents PTFE filled with 2½ volume percent irregularly shaped alumina particles.

VI represents PTFE filled with 5 volume percent irregularly shaped alumina particles.

VII represents PTFE filled with 10 volume percent irregularly shaped alumina particles.

VIII represents PTFE filled with 2½ volume percent spherically shaped alumina particles.

IX represents PTFE filled with 5 volume percent spherically shaped alumina particles.

X represents PTFE filled with 10 volume percent spherically shaped alumina particles.

Figure 2:
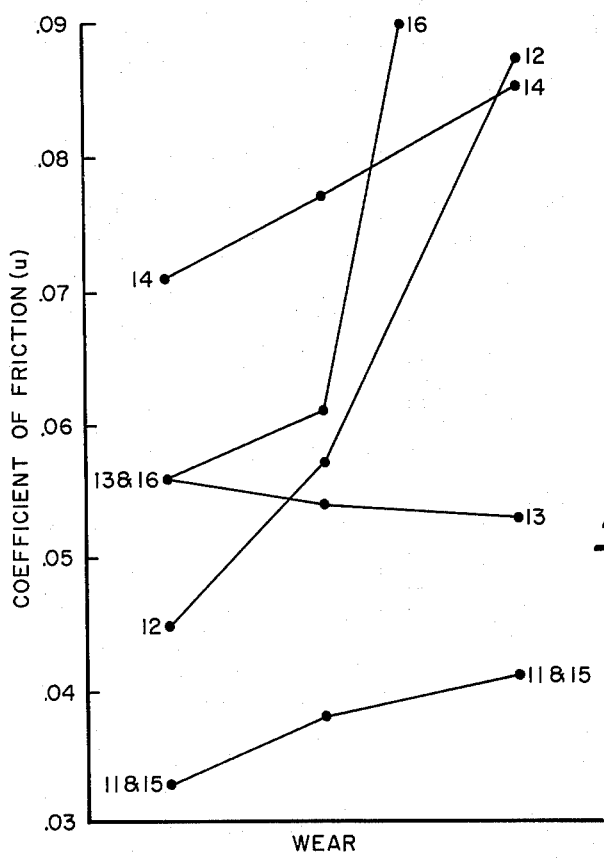

FIGURE 2 demonstrates the change in coefficient of friction with wear for various prior art filled PTFE and that of the present invention when tested on a smooth mating surface. The mating surface was stainless steel with an 8–10 R.M.S. finish which was polished with No. 3 alumina grit.

11 represents pure Teflon.

12 represents PTFE filled with irregular ceramic and molybdenum disulphide particles.

13 represents PTFE filled with irregularly shaped glass and molybdenum disulphide particles.

14 represents PTFE filled with irregularly shaped glass and carbon.

15 represents PTFE filled with 10 volume percent spherical alumina particles.

16 represents PTFE filled with 10 volume percent irregular alumina particles.

Figure 3:
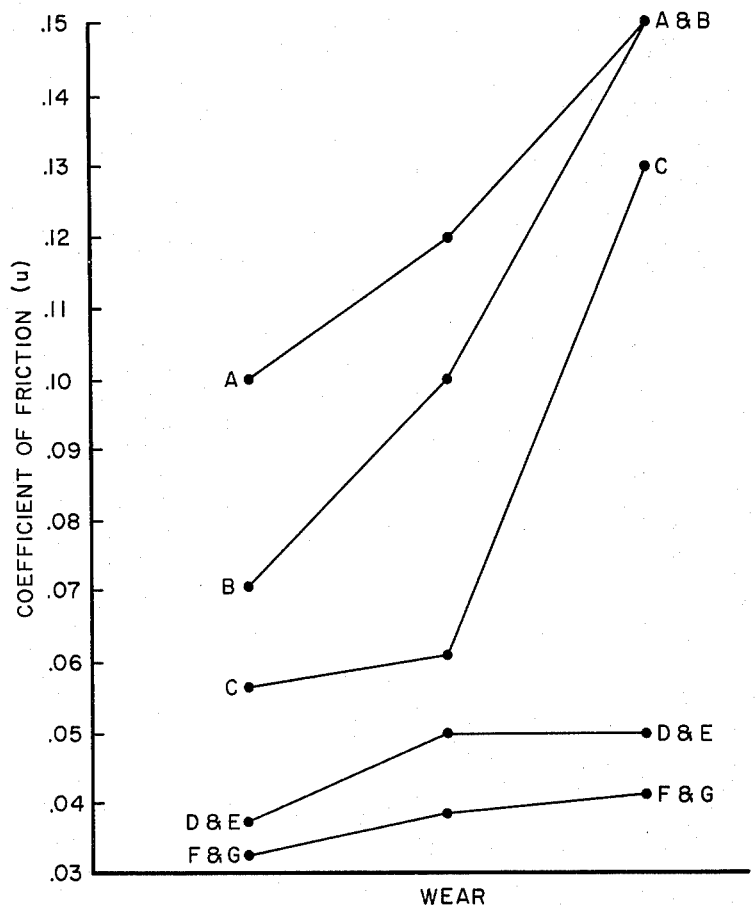

FIGURE 3 compares the change in coefficient of friction with wear for PTFE filled with irregularly shaped alumina particles and PTFE filled with spherically shaped alumina particles. These materials were tested on the same smooth journal as that used in procuring data for FIGURE 2.

A represents PTFE filled with 30 volume percent irregular alumina particles.

B represents PTFE filled with 20 volume percent irregular alumina particles.

C represents PTFE filled with 10 volume percent irregular alumina particles.

D represents PTFE filled with 30 volume percent spherical alumina particles.

E represents PTFE filled with 20 volume percent spherical alumina particles.

F represents PTFE filled with 10 volume percent spherical alumina particles.

G represents pure PTFE.

Figure 4:
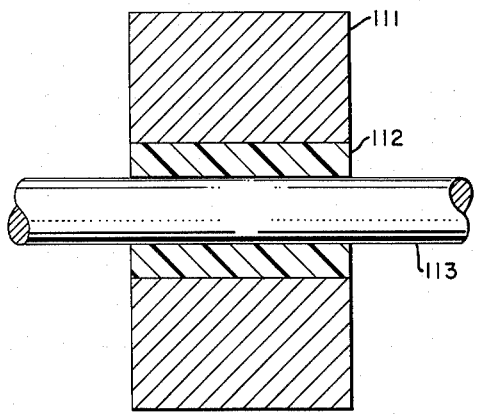

FIGURE 4 shows a schematic diagram of a bearing utilizing a material prepared in accordance with the present invention.

As discussed above, spherically shaped filler particles possess many advantages over the irregularly shaped fillers of the prior art when used in a bearing material of the type herein described. When subjected to load, as all bearing materials are, the filler particles tend to deform. For this reason, it has been determined that the particles utilized must be hard and have a correspondingly high modulus of elasticity. To be effective, it has been found that the particles must possess a hardness value of about 7.5 or higher on the Mohs' scale.

Specifically, to achieve the advantages of the present invention, the filler particles must be characterized by the following properties. The particles must not react chemically with the matrix into which they are incorporated. They must have a high modulus of elasticity and a hardness value of above 7.5 or higher on the Mohs' scale. They must be non-metallic and essentially spherical in shape. Many materials capable of being spheroidized and fulfilling the above requirements are available such as alumina, tungsten carbide, zirconium carbide, and zirconia. Only a sampling of the many available materials is listed here.

Many matrix materials that are solid high molecular weight polymers with low coefficients of friction are available for use in accordance with the present invention. Polytetrafluoroethylene, fluorinated ethylene-propylene, phenolic, polychlorotrifluoroethylene, and the like are illustrative of a few of the many available matrix materials of this type which are satisfactory for use.

As discussed above, the advantages offered by the present invention may be achieved through the combination of many materials. PTFE filled with spherical alumina particles will be discussed herein as a typical example and a preferred embodiment of the present invention. Using the preferred embodiment, several samples containing variou volume percent spherical alumina fillers were prepared. Good results in terms of increasing wear resistance and maintaining the coefficient of friction close to that of the pure matrix material are achieved through the range of about 2 volume percent to about 70 volume percent filler particles. Particle size is not considered critical but the optimum has been found to be about 2–10 microns in diameter. Referring now to FIGURE 1, it is seen that pure Teflon (I) has poor wear resistance. Irregular filler materials as evidenced by II through IV, have been found to increase the wear resistance of PTFE matrix. It is seen that the filler percentage in II through IV is approximately 25 volume percent. In contrast to this, VIII through X represent the much lower volume percent filler of spherical alumina which has been found to render the PTFE matrix wear resistant to much the same extent as the higher volume percent fillers of the prior art.

This has been explained by a study of the run-in or wear process of the bearing material. It has been found that bearing material prepared in accordance with the present invention when submitted to an initial run-in period wears rapidly during the first part of the test. The coefficient of friction at the beginning of run-in is low with a gradual slight increase in coefficient of friction to a higher value and a higher wear resistance. It is believed that these results are due to a wearing of the composite matrix filler material at the beginning of run-in and a reimpregnation of the filler particles, thus loosened from the matrix, onto the surface of the bearing material. This action occurs until approximately 60 percent of the bearing surface area is covered with the reimbedded spherical particles. When this point is reached, the coefficient of friction and the wear characteristics assume a substantially constant value. This can be seen by a study and comparison of the various examples disclosed in FIGURE 2. Nos. 12, 13, 14, 15 and 16 represents PTFE filled with various irregular particles as listed above. No. 11 shows the change in coefficient of friction for pure PTFE. No. 15 shows the change in coefficient of friction for PTFE filled with 10 volume percent spherical alumina. It is seen that all of the curves have a much higher coefficient of friction after an initial run-in period than 11 and 15. Averaging the values resulting from run-in for several samples, the spherical filled PTFE is seen to be essentially the same as that of pure PTFE over the entire range of wear.

Referring to FIGURE 3, it is seen that the particle shape is extremely important in determining the coefficient of friction of the bearing material. A, B and C represent PTFE filled with 30, 20 and 10 volume percent irregular alumina respectively. D and E represent PTFE filled with 30, and 20 volume percent spherical alumina respectively while F and G represent PTFE filled with 10 volume percent spherical alumina and pure PTFE respectively. It is seen that the spherical filled material has a much lower coefficient of friction after the initial run-in period than the irregular filled material.

FIGURE 4 is a schematic representation of the use of a material prepared in accordance with the present invention as a bearing material. No. 111 represents a sleeve or the like into which a PTFE insert 112 is inserted and which is arranged in such a manner as to contact shaft 113 in a bearing fashion.

Having thus described the present invention, what is claimed is:

1. A bearing material comprising a solid polymer matrix material having a relatively low coefficient of friction selected from the group consisting of polytetrafluoroethylene, fluorinated ethylenepropylene and polychlorotrifluroethylene; said matrix material containing inert, substantially spherical, non-metallic particles in the range from about 2½% to about 70% by volume; said particles having a relatively high coefficient of friction, a relatively high modulus of elasticity with respect to said matrix material and a hardness value on the Mohs' scale of at least 7.5; said particles being further characterized in that they are selected from the group consisting of alumina, tungsten carbide, zirconia carbide and zirconia and range in size from about 2 to about 10 microns in diameter.

2. The bearing material of claim 1 wherein said particles range from about 2½% to about 10% by volume.

3. A bearing material comprising a relatively low coefficient of friction matrix material selected from the group consisting of polytetrafluoroethylene, fluorinated ethylenepropylene and polychlorotrifluoroethylene; said matrix material containing inert substantially spherical alumina particles in the range from about 2½% to about 70% by volume; said alumina particles possessing a relatively high modulus of elasticity, a relatively high coefficient of friction with respect to said matrix material, a hardness value on the Mohs' scale of 7.5 and ranging in size from about 2 to about 10 microns in diameter.

4. The bearing material according to claim 3 wherein said alumina particles range from about 2½% to about 10% by volume.

5. A bearing material comprising a polytetrafluoroethylene matrix containing substantially spherical alumina particles in the range from about 2½% to about 70% by volume, said particles having a hardness value on the Mohs' scale of at least 7.5 and ranging in size from about 2 to about 10 microns in diameter.

6. A bearing material according to claim 5 wherein said alumina particles range from about 2½% to about 10% by volume.

(References on following page)

References Cited by the Examiner

UNITED STATES PATENTS

| | | | |
|---|---|---|---|
| 2,400,099 | 5/1946 | Brubaker et al. | 252—12 |
| 2,915,475 | 12/1959 | Bugosh | 252—25 |
| 2,964,476 | 12/1960 | Coad | 252—12 |
| 2,977,302 | 3/1961 | Spengler et al. | 252—12 |
| 3,081,196 | 3/1963 | MacDonald | 252—25 |

FOREIGN PATENTS 837,198   6/1960   Great Britain.

DANIEL E. WYMAN, *Primary Examiner.*

ALPHONSO D. SULLIVAN, *Examiner.*

I. VAUGHAN, *Assistant Examiner.*